United States Patent [19]
Koch et al.

[11] 3,993,459
[45] Nov. 23, 1976

[54] CATALYST FOR THE CONVERSION OF HIGHER HYDROCARBONS AND METHOD OF GENERATING A FUEL

[75] Inventors: Christian Koch, Nurnberg-Grossgrundlach; Herbert Stenger, Ochenbruck, both of Germany

[73] Assignee: Siemens Aktiengesellschaft, Munich, Germany

[22] Filed: Apr. 28, 1975

[21] Appl. No.: 572,515

[30] Foreign Application Priority Data
Apr. 30, 1974 Germany............................ 2421051

[52] U.S. Cl. .................................. 48/212; 252/462
[51] Int. Cl.² ...................... C01B 2/16; B01J 23/10; B01J 23/76
[58] Field of Search........................ 252/462; 48/212

[56] References Cited
UNITED STATES PATENTS
3,878,130  4/1975  Michel et al. .................. 252/465 X

*Primary Examiner*—W. J. Shine
*Attorney, Agent, or Firm*—Kenyon & Kenyon Reilly Carr & Chapin

[57] ABSTRACT

A catalyst for converting higher hydrocarbons, in particular for converting such hydrocarbons into gas mixtures containing carbon monoxide, methane and/or hydrogen in which the active component oxides of the metals lanthanum, cobalt, nickel, uranium, cerium and thorium are placed on an oxide substrate, preferably a sintered body of magnesium oxide or aluminum oxide to result in a catalytic structure particularly useful with internal combustion engines for motor vehicles.

14 Claims, 1 Drawing Figure

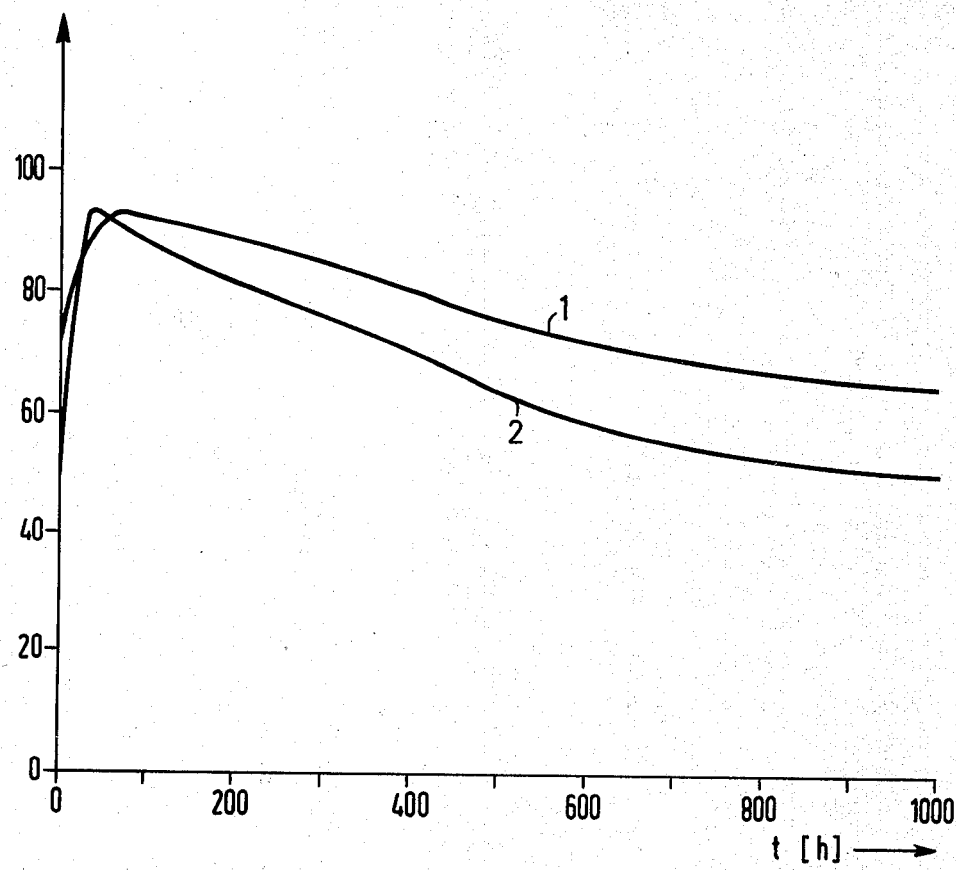

CATALYST FOR THE CONVERSION OF HIGHER HYDROCARBONS AND METHOD OF GENERATING A FUEL

BACKGROUND OF THE INVENTION

This invention relates to catalysts for the conversion of higher hydrocarbons in general and more particularly to an improved catalyst giving increased activity and longer life.

In U.S. Pat. application Ser. No. 334,932, filed Feb. 22, 1973, now U.S. Pat. No. 3,878,130, granted Apr. 15, 1975, a catalyst for the conversion of higher hydrocarbons into a reformed gas mixture is disclosed. In particular, a catalyst for converting hydrocarbons into gas mixtures containing carbon monoxide, methane and/or hydrogen is disclosed. The catalyst is supported on an oxide catalyst carrier and includes oxides of the metals lanthanum, cobalt, nickel and uranium as the active components. The gas mixture obtained in the conversion of the hydrocarbons, which conversion is carried in the presence of a gas serving as an oxygen carrier such as air in what are referred to as reformed gas generators, i.e. the reformed gas, can be used to advantage as the fuel for an internal combustion engine, particularly the internal combustion engines used in motor vehicles. See also U.S. Patent Application Serial Nos. 318,616 (now U.S. Pat. No. 3,828,736); 283,412; 270,923 [now abandoned]; 372,422 [now U.S. Pat. No. 3,897,252] and 378,234, [now abandoned]. In an internal combustion engine the reformed gas burns along with secondary air in a faster and more complete manner than do the higher hydrocarbons themselves, e.g. hydrocarbons in the form of gasoline. By so converting the higher hydrocarbons into a reformed gas the emission of harmful substances in the exhaust gas can be considerably lower [see Siemens Forschungsund Entwicklungsberichte; vol. 2 (1973), no. 1, pages 58 to 62]. The aforementioned catalyst is inexpensive to manufacture and available on a large scale permitting its application at a low cost and without production difficulty in motor vehicles using reformed gas generators. This is in contrast to the use of platinum, for example, as a catalyst. It has also been discovered that the catalyst in general has increased activity and long life for converting mixtures of higher hydrocarbons and oxygen containing gases into a reformed gas. However, under certain operating conditions, particularly when the gas mixture to be converted is only in contact with the catalyst for a short time, difficulties may be encountered in the long run in converting large quantities of fuel and in generating reformed gas of uniformly high quality. It has been noted that, with short dwell times in the catalyst, minor losses in activity are more noticeable. In view of these difficulties, the need for an improved catalyst for the conversion of higher hydrocarbons which has a better life in activity, particularly when used in the manner in which the hydrocarbons do not dwell too long in the area of the catalyst, becomes evident.

SUMMARY OF THE INVENTION

The present invention provides such a catalyst. Starting with the catalyst and catalyst support structure described in the aforemention U.S. Pat. No. 3,878,130 in which the oxides of the metals lanthanum, cobalt, nickel and uranium on an oxide substrate are used as active components there is added, as additional active components, oxides of the metal cerium and thorium. Such a catalyst results in advantageous effects which can be traced back to an interaction between the oxide carrier material, i.e. the substrate, and the active components. In this type of arrangement the active component is at least partially built into the lattice of the carrier material which may itself also have a certain activity. Thus, lanthanum and nickel or their oxides can be built into a spinel lattice. Cobalt oxide, on the other hand, prefers to attach itself at active centers of the substrate material. Uranium oxides prevent the catalyst from being deactivated by thermal diffusion. Without this substance, a coherent cobalt layer leading to deactivation can form on one side of the catalyst due to a temperature gradient therein, as an example. Furthermore, uranium oxide accelerates the conversion reaction being preformed, particularly during the starting phase. Cerium and thorium, finally, increase the stability and activity of the catalyst.

In accordance with present invention to obtain the necessary long life and high activity it is generally sufficient that the total content of cerium [Ce] and thorium [Th] in the active catalyst component be between 0.1 and 10% by weight referred to the total contend of lanthanum, cobalt, nickel and uranium. The weight ratio of Ce to Th can be between the ranges of 1:9 and 9:1. It is preferable, however, that the cerium and thorium be present in a weight ratio of about 1 to 1 since in that case the best values for long term activity of the catalyst are obtained.

The quantitive amounts of the active metal components of the catalyst of the present invention are advantageously as follows: 54 to 90% by weight of lanthanum; 2 to 29% by weight of cobalt; 1 to 10% by weight of nickel; 0.1 to 8% by weight of uranium and 0.1 to 9% by weight of cerium and thorium together, all referred to the total content of these metals in the catalyst and with the percentages of individual metals adding up to 100%. More preferably, the catalyst will contain between 64 and 77% by weight lanthanum, 15 to 25% by weight cobalt, 2 to 6% nickel, 1 to 2% weight uranium and 1 to 3% by weight cerium and thorium combined. When an active catalyst component of this composition the aforementioned interaction between the active and the substrate material becomes particularly favorable.

A specific mixture which is preferable has about 69.3% by weight lanthanum, 24.2% by weight cobalt, 2.9% by weight nickel, 1.8% by weight uranium, 0.9% by weight cerium and 0.9% by weight thorium, refer to the total metal content of active metal component in the catalyst. The catalyst of the present invention preferably contains 2 to 13% by weight of the active oxide component, refer to the weight of the oxide carrier material, i.e. substrate. The active oxide component or the active component is understood herein to be metal oxides whereas their metal content is noted as the active metal component. A high conversion rate of the hydrocarbons fed to the catalyst is obtained, particularly with exothermic reactions, for an active component content of the catalyst in the range of 5–9% by weight and more particularly with a content of about 8% by weight referred to the carrier material.

Examples of oxide carrier materials are aluminum oxide $Al_2O_3$, magnesium oxide $MgO$, silicon dioxide $SiO_2$, zirconium dioxide $ZrO_2$ and titanium dioxide $TiO_2$ as well as mixtures of these oxides. It is advantageous if the carrier consists of 0 to 50% by weight of magnesium oxide and 100 to 50% by weight of aluminum oxide. Preferably aluminum oxide in the form of $\alpha$—$Al_2O_3$ is used. With mixtures of MgO and $Al_2O_3$ the Mgo has a stabilizing effect on the $Al_2O_3$ as a spinel, i.e., the double oxide $MgO.Al_2O_3$ can be formed. Spinel, as already mentioned, exhibits good carrier properties for the active components of the present invention. A preferably carrier material will contain approximately 15% by weight MgO and 85% by weight $\alpha$—$Al_2O_3$. With this composition spinel formation is particularly pronounced.

The reaction temperature for conversion of the hydrocarbons is generally between 700 and 950° C. In the process carbon monoxide [CO], hydrogen [$H_2$], methane [$CH_4$] and lower hydrocarbons are produced from the higher hydrocarbons. At lower temperatures such as temperatures below 650° C, the reformed gas will also contain carbon dioxide [$CO_2$] and water vapor [$H_2O$] due to secondary reactions. In particular, carbon dioxide and water will be formed at those points of the catalyst where the temperature falls below 650° C. It has been discovered that the activity of the catalyst of the present invention can be maintained even at relatively low reaction temperatures if the catalyst contains more nickel than cobalt. To accomplish this weight ratio of nickel to cobalt can be up to 20:1. By increasing the nickel share and at the same time reducing the cobalt share, the secondary reaction leading to the formation of carbon dioxide and water are inhibited and the share of combustible component is thereby increased.

The oxide carrier material will advantageously have the form of sintered, porous slabs provided with a plurality of approximately parallel canals, such slabs being referred to as perforated block slabs. With such a structure a large effective area is obtained with low pressure loss in conversion of hydrocarbon. Slabs having 40 to 60 canals per $cm^2$ with the diameter of canals between 0.8 and 1.3 mm are preferable. Slabs with a porosity of about 40 to 45% by volume are preferred.

The catalyst of the present invention is particularly well suited for generating a fuel gas containing CO, $CH_4$ and/or $H_2$ for use in internal combustion and particularly engines used in motor vehicles. The fuel gas is obtained through the oxidation splitting of higher hydrocarbons, particularly hydrocarbons with a carbon number higher than 4. In addition to the higher hydrocarbons an oxygen carrier gas such as air or other oxygen containing gases are used in the conversion. It has furthermore been found that the catalyst of the present invention is well suited for the generation of reformed gas where the oxygen containing gas contains $CO_2$. As a result, a mixture of air and exhaust gas from the internal combustion engine, which exhaust will contain, in addition to nitrogen from the combustion air, carbon dioxide and water, can be used to advantage as an oxygen carrier. In such operation the exhaust gas component may be in an amount up to 50% by volume; $CO_2$ content of the oxygen carrier is advantageously about 3 to 8% by volume. When using an oxygen carrier containing $CO_2$, the activity of the catalyst is not only maintained but drops in activity which can occur over an extended period of time when using air exclusively are eliminated. This type of action occurs with a brief delay [in the range of a few seconds to minutes]. It is assumed that the addition of $CO_2$ influences the CO—$CO_2$ equilibrium which affects the transition of the higher inactive oxidation stages of the catalyst to be low, active oxidations stages. In addition, the $CO_2$ lowers the exothermic heat balance and therefore the quantity of fuel consumed per kilocalorie of calorific value of the reformed gas, i.e. the quantity of hydrocarbon.

The catalyst of the present invention is manufactured so that the active component is placed on the carrier material by simultaneous or successive impregnation of the oxide carrier material which as noted above will be preferably 0 to 50% by weight magnesium oxide and 100 to 50% by weight aluminum oxide. Impregnation is accomplished with solutions of thermally decomposable salts of the metals cobalt, nickel, lanthanum, cerium, thorium and uranium. These are then dried at about 80 to 180° C and then calcined at temperatures of between 500 and 900° C. As noted, the mass contents of active metal components will preferable be 54 to 90% by weight of lanthanum, 2 to 29% by weight of cobalt, 1 to 10% by weight of nickel, 0.1 to 8% by weight of uranium and 0.1 to 9% by weight of cerium and thorium combined. In particular the metal nitrates are used as the easily decomposible salts.

BRIEF DESCRIPTION OF THE DRAWING

The single FIGURE is a curve comparing the activity of the catalyst of the present invention with that of the prior art.

DETAILED DESCRIPTION OF THE PREFERRED EMBODIMENT

The invention will now be explained in further detail through the use of an example along with the FIGURE illustrating the long term behavior of the two catalysts.

Preferably perforated block slabs will be made using the method disclosed in U.S. Pat. No. 3,878,130 with a composition of approximately 15% by weight MgO and 85% $\alpha$—$Al_2O_3$. Each perforated slab will have the dimensions 46 by 66mm by 14mm and a weight of about 50g. Following manufacture of the slabs, the active component of the catalyst is then prepared as follows: 4.0g of cobalt nitrate $Co(NO_3)_2 \cdot 6 H_2O$, 0.48 g of nickel nitrate $Ni(NO_3)_2 \cdot 6 H_2O$, 7.2 g of lanthanum nitrate $La(NO_3)_3 \cdot 6 H_2O$, 0.095 g of cerium nitrate $Ce(NO_3)_3 \cdot 6 H_2O$, 0.075 g of thorium nitrate $Th(NO_3)_4 \cdot 5 H_2O$ and 0.125 g of uranyl nitrate $UO_2(NO_3)_2 \cdot 6 H_2O$ are dissolved through brief heating to about 90° C in about 4 ml of distilled water. The solution is then allowed to cool to about 50° C after which the perforated slab is impregnated with this solution. After drying for about an hour at a temperature of 100° C, the metal nitrate containing slab is heated for calcining for about 2 hours at a temperature of about 700° to 900° C during which time the metal nitrates are decomposed and converted into oxides. A catalyst made in this manner will contain the following quantities of metals in the form of oxides: 69.3% by weight of lanthanum, 24.2% by weight of cobalt, 2.9% by weight of nickel, 1.8% by weight of uranium, 0.9% by weight of cerium and 0.9% of thorium. For reasons of clarity, the metal content of the active component is given in each case. The total content of the active component in the catalyst, i.e. the content of metal oxides is about 8% by weight. Following the decomposition of the metal salts, the perforated block slab may be further heated in a reducing atmosphere such as hydrogen. By doing so, the start up time and start up temperature, in particular of the conversion reaction in which the catalyst is used can be reduced when the catalyst is first used.

The performance capabilities of the catalyst of the present invention, in comparison to the catalyst described in U.S. Pat. No. 3,878,130 manifests itself in a higher conversion rate at high volumetric loading as well as an improved permanent activity. Data was obtained comparing the catalysts of the aforemention patent with that of the present invention. A catalyst designated A in the table below was prepared in the manner described above, i.e. using Co, Ni, La, Ce, Th and U. Another catalyst designated B in the table was prepared in accordance with the aforementioned patent and had the following composition: about 8% by weight of active component on a corresponding perforated block slab, i.e. a slab with a content of about 15% by weight MgO and 85% by weight $\alpha$ —$AlO_2$ with the active component containing 70.6% by weight of lanthanum, 24.6% by weight of cobalt, 3% by weight of nickel and 1.8% by weight of uranium. In the conversion of gasoline with an empirical formula $C_8H_{16}$ at approximately 800° C, for the indicated loading given below [in liters of gasoline per liter of catalyst per hour] the following converion rates were obtained:

| Catalyst A | | Catalyst B | |
|---|---|---|---|
| Loading V/V/h | Conversion Rate % by weight | Loading V/V/h | Conversion Rate % by weight |
| 9.5 | 100 | 10.7 | 100 |
| 16.0 | 80 | 15.2 | 80 |
| 24.0 | 70 | 22.2 | 65 |

It is evident that with the catalyst A of the present invention a high conversion rate can be obtained even at high volumetric loading and a correspondingly lower dwell time.

In addition, it has been discovered that the catalyst of the present invention also shows improved permenant activity. The results in continuous operation over a long period of time are shown on the FIGURE in which the operating time in hours is plotted on the abscissa and the conversion rate in per cent by weight on the ordinate. Curve 1 shows the results obtained with the catalyst of the present invention, i.e. catalyst A of the table above and curve 2 those obtained with the catalyst of the of the aforementioned patent, i.e. catalyst B of the table above. Both curves were obtained under the following reaction conditions: Reaction of a gasoline vapor-air mixture at about 800° C; loading with gasoline ($C_8H_{16}$); 15.7 liters per liter of catalyst per hour; amount of air approximately 3.8 m³/hr. It is evident from the FIGURE that the catalyst of the aforementioned patent results in a throughput which drops about 50% after 1000 operating hours, whereas the catalyst of the present invention is still at about 65% activity after this operating time, i.e. it actually is considerably higher. The catalyst of the present invention, thus, prevents rapid and premature aging. The danger of rapid aging exists particularly at high volumetric loading or short dwelling time. Then, due to the reduced conversion in the front region of the perforated slabs, the partial oxygen pressure or the oxygen content increases in the catalyst. It has now been discovered, that these variable reaction conditions influence the activity of the catalyst of the present invention to a much lesser extent than they influence the catalyst of the aforementioned patent.

A further advantage of the catalyst of the present invention is seen in the case of frequent temperature changes, for example, with frequent increases from ambient to reaction temperature. It has been noted that drop in activity which generally occurs temporarily during the staring process is far less noticeable in the catalyst of the present invention than in the catalyst of the aforementioned patent.

Thus, a improved catalyst for the conversion of higher hydrocarbons into a reformed gas has been disclosed. Although a specific embodiment has been described, it will be obvious to those skilled in the art that various modifications may be made without departing from the spirit of the invention which is intended to be limited solely by the appended claims.

We claim:
1. A catalyst for the conversion of higher hydrocarbons into a reformed gas and at least one of methane and hydrogen comprising:
   a. an oxide carrier material; and
   b. active catalyst components contained on said oxide carrier material consisting of oxides containing 54 to 90% by weight of lanthanum, 2 to 29% by weight of cobalt, 1 to 10% by weight of nickel, 0.1 to 8% by weight of uranium and 0.1 to 9% by weight of cerium and thorium, referred to the total content of active metal components in the catalyst.

2. A catalyst according to claim 1 wherein said active metal components consists of 64 to 77% by weight of lanthanum, 15 to 25% by weight of cobalt, 2 to 6% by weight of nickel, 1 to 2% by weight of uranium, and 1 to 3% by weight of cerium and thorium combined.

3. A catalyst according to claim 2 wherein cerium and thorium are present in approximately equal amounts.

4. A catalyst according to claim 3 wherein said active metal components consists of 69.3% by weight of lanthanum, 24.2% by weight of cobalt, 2.9% by weight of nickel, 1.8% by weight of uranium, 0.9% by weight of cerium and 0.9% by weight of thorium.

5. A catalyst according to claim 1 wherein a greater amount of nickel than cobalt is present in the active component of said catalyst with the weight ratio of nickel to cobalt extending up to a maximum of 20:1.

6. A catalyst according to claim 1 wherein the active component content of the catalyst is 2 to 13% by weight, referred to the oxide carrier material.

7. A catalyst according to claim 6 wherein said content is 5 to 9% by weight.

8. A catalyst according to claim 7 wherein said content is 8% by weight.

9. A catalyst according to claim 1 wherein said oxide carrier material contains between 0 and 50% by weight magnesium oxide and 100 to 50% by weight of aluminum oxide.

10. A catalyst according to claim 11 wherein said oxide carrier material consists of approximately 15% by weight magnesium oxide and 85% by weight $\alpha$ —$Al_2O_3$.

11. A catalyst according to claim 1 wherein said oxide carrier material is in the form of a sintered, porous slab cotaining a plurality of approximately parallel canals.

12. A method for the manufacture of a catalyst consisting of oxides of cobalt, nickel, lanthanum, cerium thorium and uranium comprising the steps of:
   a. preparing an oxide carrier slab;

b. impregnating said slab with solutions of thermally easily decomposible salts of the metals cobalt, nickel, lanthanum, cerium, thorium and uranium;
c. drying said impregnated slab at about 80° to 180° C; and
d. calcining said dried slab at temperatures of approximately between 500° and 900° C.

13. The method according according to claim 12 wherein said oxide carrier consists of 0 to 50% by weight of magnesium oxide and 100 to 50% by weight of aluminum oxide and wherein the mass content of the active metal component added by impregnation consists of oxides containing 54 to 90% by weight of lanthanum, 2 to 29% by weight of cobalt, 1 to 10% by weight of nickel, 0.1 to 8% by weight of uranium and 0.1 to 9% by weight of cerium and thorium combined.

14. A method of generating a fuel containing carbon monoxide, and at least one of methane and hydrogen through the reaction of higher hydrocarbons with an oxygen carrier comprising:
carrying out the reaction at an elevated temperature between 700° and 950° C using a catalyst consisting of;
a. an oxide carrier material; and
b. active catalyst components contained on said oxide material consisting of oxides containing 54 to 90% by weight of lanthanum, 2 to 29% by weight of cobalt, 1 to 10% by weight of nickel, 0.1 to 8% by weight of uranium and 0.1 to 9% by weight of cerium and thorium referred to the total content of active metal components in the catalyst.

* * * * *